US006865652B1

(12) United States Patent
Pencis et al.

(10) Patent No.: US 6,865,652 B1
(45) Date of Patent: Mar. 8, 2005

(54) FIFO WITH UNDO-PUSH CAPABILITY

(75) Inventors: Jennifer Pencis, Austin, TX (US); Chandrakant Pandya, Austin, TX (US); Sanjiv K. Lakhanpal, Austin, TX (US); Mark D. Nicol, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 754 days.

(21) Appl. No.: 09/586,575

(22) Filed: Jun. 2, 2000

(51) Int. Cl.[7] ............................................. G06F 12/00
(52) U.S. Cl. .......................... 711/154; 711/133; 710/5; 345/503
(58) Field of Search ................................. 711/154, 114, 711/141, 142, 167, 133; 710/5, 40, 263, 305; 708/523; 345/503, 531

(56) References Cited

U.S. PATENT DOCUMENTS

| | | | | |
|---|---|---|---|---|
| 5,603,010 A | * | 2/1997 | Dodd et al. ................. | 711/167 |
| 5,931,920 A | * | 8/1999 | Ghaffari et al. ............... | 710/5 |
| 6,088,740 A | * | 7/2000 | Ghaffari et al. ............... | 710/5 |
| 6,112,265 A | * | 8/2000 | Harriman et al. ............. | 710/40 |
| 6,170,030 B1 | * | 1/2001 | Bell ............................ | 710/310 |
| 6,226,695 B1 | * | 5/2001 | Kaiser et al. .................. | 710/5 |
| 6,275,905 B1 | * | 8/2001 | Keller et al. ................ | 711/141 |
| 6,393,529 B1 | * | 5/2002 | Keller ........................ | 711/141 |
| 6,487,637 B1 | * | 11/2002 | Arimilli et al. ............. | 711/133 |
| 6,526,430 B1 | * | 2/2003 | Hung et al. .................. | 708/523 |

OTHER PUBLICATIONS

James Noctor, Class Fifo, Dec. 5, 1997, NCL Technologies, http://www.noctor.com/doc/api/ie/ncl/util/Fifo.html, pp. 1–4.*

Oliver Wieland, Class UndoManger, http://fopps.sourceforge.net/api/org/fopps/share/UndoManger.html, pp. 1–6.*

AMD Athlon™ Processor Technical Brief, Publication No. 22054, Dec. 1999, pp. 1–7.

AMD Athlon™ Processor Data Sheet, Publication No. 21016–D, Aug., 1999, pp. 1–58.

* cited by examiner

Primary Examiner—Mano Padmanabhan
Assistant Examiner—Thang Ho
(74) Attorney, Agent, or Firm—Zagorin, O'Brien & Graham, LLP

(57) ABSTRACT

A plurality of command segments comprising one command are received into an integrated circuit in a plurality of phases, each command segment being received in a different phase. The command segments are pushed into a command queue. Control logic checks for a cancellation indication for the command being received. If a cancellation indication is received, the control logic for the command queue performs an undo-push operation to remove the command segments stored in the command queue associated with the cancelled command.

18 Claims, 6 Drawing Sheets

| BIT-TIME | BIT NUMBER | | | | | | | | | | | | |
|---|---|---|---|---|---|---|---|---|---|---|---|---|---|
| | 14 | 13 | 12 | 11 | 10 | 9 | 8 | 7 | 6 | 5 | 4 | 3 | 2 |
| 0 | M1 | COMMAND[4:0] | | | | | PA[34:28] | | | | | | |
| 1 | PA[27:22] | | | | | | PA[12:6] | | | | | | |
| 2 | M2 | MASK[7:0] | | | | | | | | CH | ID[2:0] | | |
| 3 | RV | PA[21:13] | | | | | | | | | PA[5:3] | | |

FIG. 3A

| BIT-TIME | BIT NUMBER | | | | | | | | | | | | |
|---|---|---|---|---|---|---|---|---|---|---|---|---|---|
| | 14 | 13 | 12 | 11 | 10 | 9 | 8 | 7 | 6 | 5 | 4 | 3 | 2 |
| 0 | 0 | 00001 | | | | | STATUS[1:0] | | DM | VS | VDB[2:0] | | |
| 1 | 0 | | | | | | | | | MS | MAB[2:0] | | |
| 2 | 0 | X | | | | | | | | | | | |
| 3 | X | | | | | | | | | | | | |

FIG. 3B

FIFO WITH UNDO-PUSH CAPABILITY

RELATED APPLICATIONS

This application is related to the following applications filed the same day as the present application, which applications are incorporated herein by reference in their entirety:

Application Ser. No. 09/586,574 entitled "Command Receive Filter", naming Jennifer Pencis, Chandrakant Pandya, Sanjiv K. Lakhanpal and Mark D. Nicol as inventors; and Application Ser. No. 09/586,573 entitled "Out of Order Probing in An In-Order System", naming Sanjiv K. Lakhanpal, Jennifer Pencis, Chandrakant Pandya, and Mark D. Nicol as inventors.

BACKGROUND OF THE INVENTION

1. Field of the Invention

This invention relates to commands received by an integrated circuit and more particularly to commands which have a possibility of being canceled.

2. Description of the Related Art

In current processor implementations, a processor issues requests to a memory controller for such transactions as, e.g., read or write commands, or probe responses. In one implementation for a stand-alone processor, a command channel is provided over which the processor issues requests to another integrated circuit incorporating the memory controller. In such systems, data may be transmitted to and from the processor over a data channel that is separate from the command channel. In a typical computer system incorporating such a processor, an integrated circuit interfaces to the processor to provide both a memory control function and a bridge function between the host bus (the command and data channel) and other system buses. One of the bridge functions typically provided is a bridge between the host bus and the industry standard Peripheral Component Interconnect (PCI) bus. Such integrated circuits have been described in the art as "north bridges".

One of the functions performed by memory controller logic on a north bridge is to probe the cache memory located on the processor in order to maintain coherence between the various components of the memory when another device, e.g., an I/O device, accesses memory. The probe determines whether the cache memory on the processor has a copy of the memory location (typically a cache line containing that memory location) about to be accessed by the I/O device. The processor responds through the command channel with a probe response indicating whether or not that particular cache line is located in the cache memory.

The command channel may be a split transaction bus in that commands such as reads may be separated from the data that is returned. Because multiple transactions may be outstanding, the processor tracks the number of outstanding transactions. The commands issued by the processor are received by the north bridge into a command queue.

The command channel may be relatively narrow, e.g., 13 bits, and therefore command/address information is sent over the command channel in multiple clock cycles. However, because certain commands are executed speculatively, a command may be canceled after a portion of the command has already been sent over the command channel. Therefore, it would be desirable to handle the cancellation of commands with a minimum effect on downstream logic.

SUMMARY OF THE INVENTION

Accordingly, the invention provides in one embodiment an integrated circuit that receives command information for one command over a plurality of bit times. The integrated circuit includes a command queue storing portions of command information received into the integrated circuit during consecutive bit times. The integrated circuit further includes control logic responsive to a cancellation indication in the command information, which indicates that the current command is canceled, to repoint a write pointer to point to the canceled command already stored in the command queue.

In another embodiment, the invention provides a method for storing command information into a command queue in an integrated circuit. The method includes receiving a plurality of command segments comprising one command in a plurality of phases, each command segment being received in a different phase. The command segments are pushed into a command queue. Control logic checks for a cancellation indication for the command being received. If a cancellation indication is received, the control logic for the command queue performs an undo-push operation to remove the command segments stored in the command queue associated with the cancelled command.

BRIEF DESCRIPTION OF THE DRAWINGS

The present invention may be better understood, and its numerous objects, features, and advantages made apparent to those skilled in the art by referencing the accompanying drawings in which the use of the same reference symbols in different drawings indicates similar or identical items.

FIGS. 3A and 3B are exemplary packets for non-probe response commands and probe response commands, respectively.

DESCRIPTION OF THE PREFERRED EMBODIMENT(S)

Figure 1:
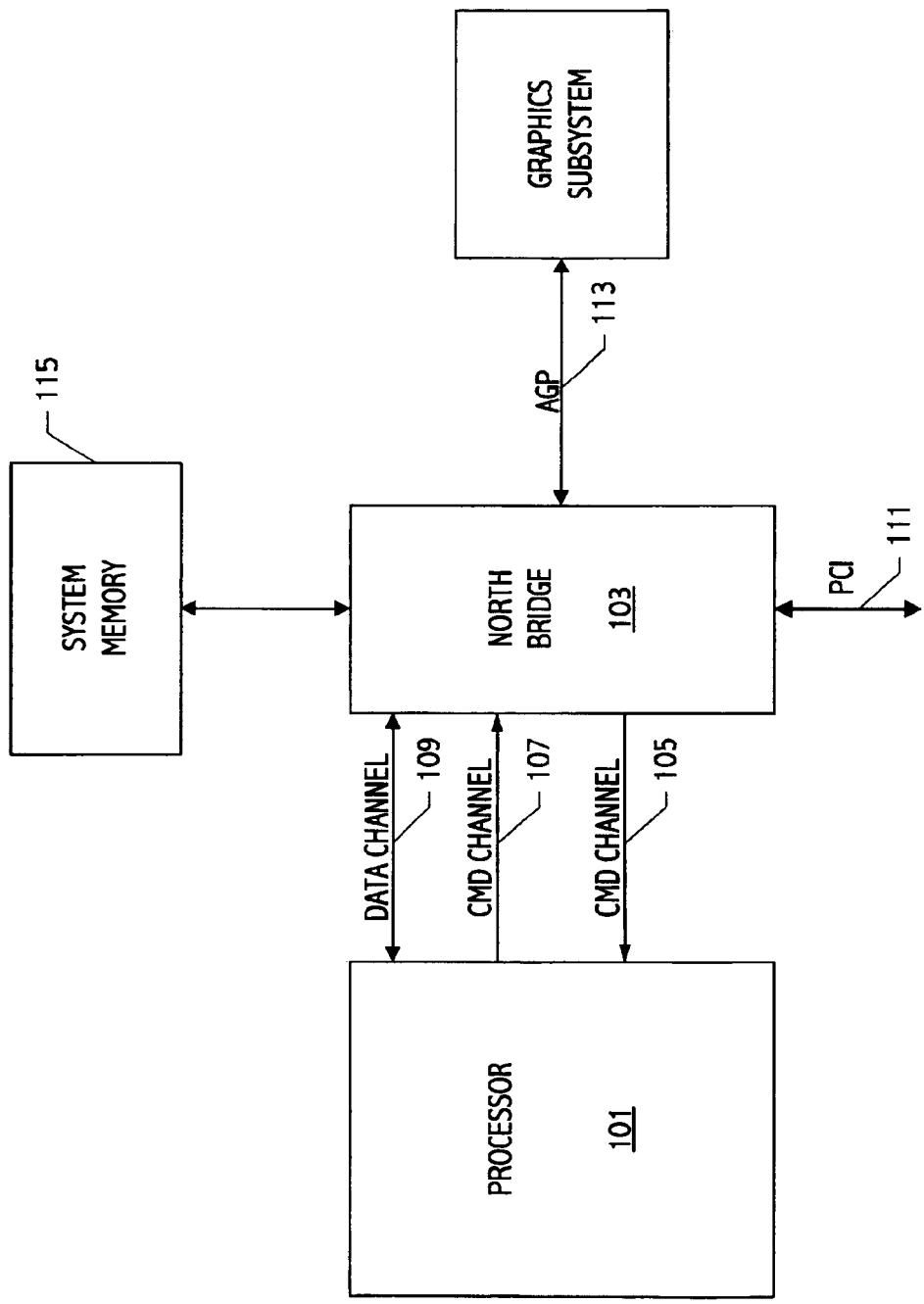
FIG. 1 is a block diagram of a system in which a processor is coupled to a north bridge by a command and data channel.

Referring to FIG. 1, the block diagram illustrates an exemplary computer system suitable for incorporating an embodiment of the invention. Processor 101 is coupled to north bridge 103 through unidirectional command channels 105 and 107 as well as a bidirectional data channel 109. The other control signals and information signals between the north bridge 103 and processor 101 are not shown to simplify the diagram. North bridge 103 provides a bridge function between the host bus (including the command and data channels) and the PCI bus 111 and Accelerated Graphics Port (AGP) 113. In addition, north bridge 103 provides a memory control function for system memory 115.

Figure 2:
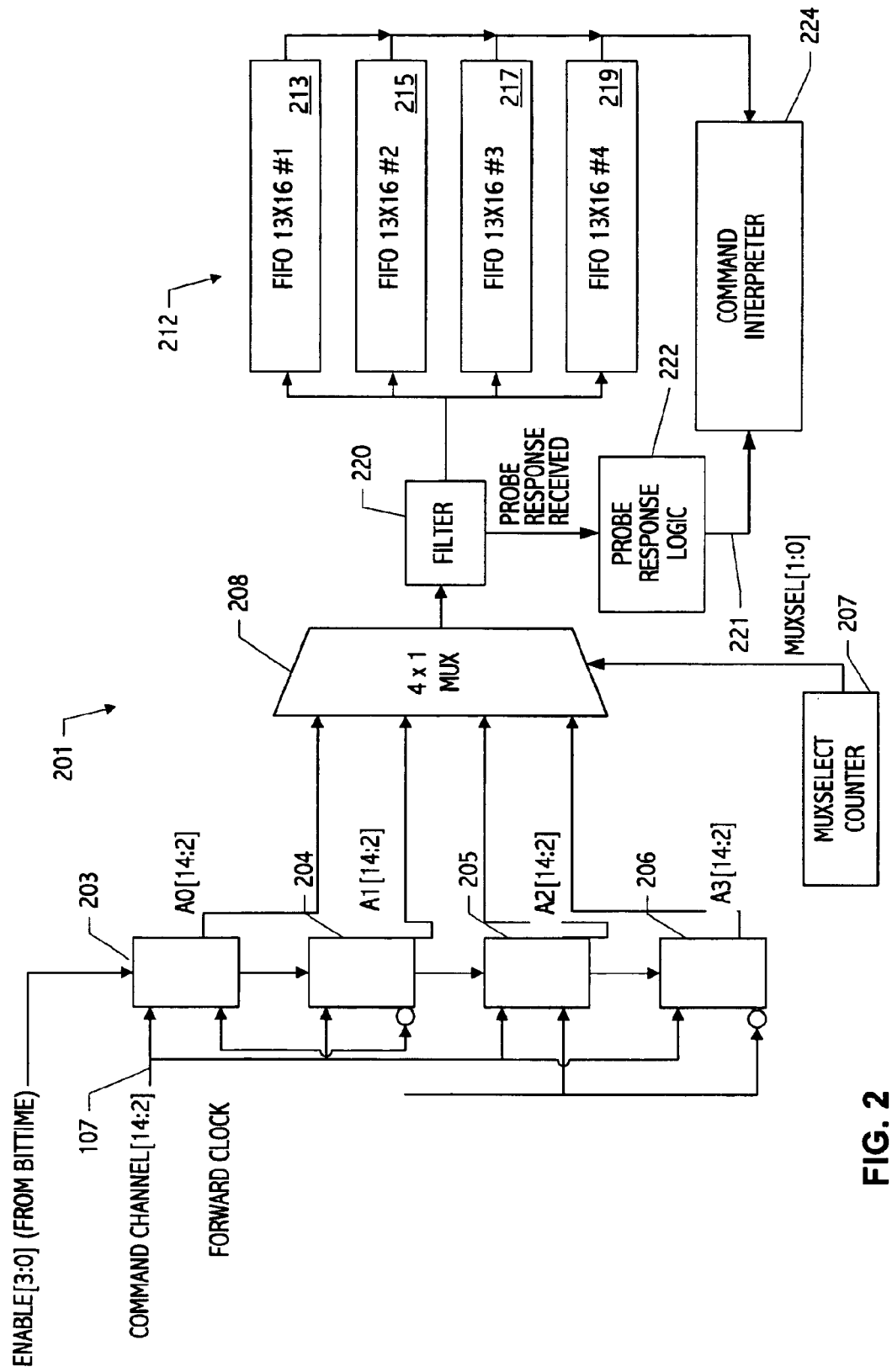
FIG. 2 illustrates a receive circuit according to an embodiment of the present invention.

Referring to FIG. 2, north bridge 103 includes a receive circuit 201 coupled to receive commands from processor command channel 107. In one embodiment, the processor bus is a split transaction bus utilizing clock forwarding technology. In one embodiment data is forwarded on each edge of the clock. Thus, each edge of the clock is a bit time. Clock forwarding refers to supplying a clock along with data on the command channel. An exemplary bus of that type is the processor bus utilized by Digital Equipment Corporation's Alpha™ EV6 or by Advanced Micro Devices Athlon™ processor. The receive circuit translates the incoming signals to the local time domain. In addition, the receive circuit includes a receive filter to remove unused commands as described further herein.

While the command channel is in idle state no operations (NOPs) are present in the channel. In one embodiment, the command channel data, which typically includes command and address information, is transferred in four bit times, i.e., four clock edges. The command channel information may include, e.g., a bit field defining the command as a read command and bit fields defining the start address and length of the read operation. The first portion of a command is sent in bit time 0. The bit time is counted in a bit time counter (not shown) that tracks the current bit time. In the illustrated embodiment, the bit time counter counts bit times from 0 to 3. As seen in FIG. 2, data from command channel 107 is clocked into one of four sets of buffers, 203–206. In one embodiment, the buffers are formed of positive edge and negative edge flip-flops to account for the fact that data is forwarded on the command channel on each clock edge. Each set of buffers in the embodiment illustrated includes 13 flip-flops so each buffer can store thirteen bits of command channel information. The command and address information from the first bit time is stored in buffer 203, the second bit time in buffer 204, the third bit time in buffer 205 and the fourth bit time in buffer 206. The enable bits [3:0] selectively enable the buffers 203–206 according to the bit time determined by the bit time counter.

A multiplexer select counter 207 provides multiplexer selects that are used to unload the command information from the receive buffers through multiplexer 208. The multiplexer select can be set to one of four values, and determines the sequence for unloading the buffers, thus accounting for differences in time domains between the command channel and the receive circuit. Once the buffers are unloaded, the command information can be assembled into the 52 bit command information in a command storage queue 212 utilized in the illustrated embodiment.

First in first out buffers (FIFOs) 213, 215, 217, and 219 provide a command storage queue 212 for a command interpreter 224. The command storage queue includes four sixteen deep 13 bit FIFOs which can assemble sixteen 52 bits commands. However, as previously mentioned, not all of the commands received on command channel 107 require a response from north bridge 103. Accordingly, a command filter 220 is included to filter out those commands which do not require a response. Those commands not requiring a response are identified in filter 220, either as hard coded values for comparison or programmable values to provide greater flexibility. The command information received from command channel 207 is compared to the predetermined commands that do not require a response. Filter 203 may be implemented as series of comparators to compare, e.g., a five bit command field in the command information to the predetermined group of commands that are not forwarded to the command queue. If the received command is not in the predetermined group of commands, then the command is forwarded to command storage queue 212. However, if the received command is one of the predetermined commands, then the received command is dropped. That way, the command interpreter does not have to deal with those commands that do not require a response.

In one embodiment the commands not requiring a response from the north bridge include NOP (used for idle cycles on the command channel), a NZNOP (containing probe information), a victim data buffer flush (VDBFlush) (related to maintaining cache coherency for cache lines evicted from the cache memory), and probe responses. Those commands are filtered out at filter 220. However, the probe response command is not simply dropped as are the other commands not requiring a response from north bridge 103.

Exemplary command packets received and filtered by filter 220 are shown in FIGS. 3A and 3B. The illustrated command packets take four bit times to transfer with the five bit command field being transferred in bit time 0. NOP commands occupy two bit times rather than four and thus can start in bit time 0 or 2. The PA fields provide the physical address bits corresponding to the command. The mask field MASK[7:0] is used for sub-cache block commands (byte, longword, or quadword) and indicates which bytes, longwords, or quadwords on data channel 109 are valid for the requested data transfer. The M1, M2 and CH bits relate to probe responses and their use is described further herein. The ID[2:0] field specifies a buffer entry in the processor corresponding to the command in CMD[4:0].

The command packet illustrated in FIG. 3B is used for certain types of probe responses. As previously mentioned, the probe responses are not simply dropped as are the other commands not requiring a response from north bridge 103. Instead, in order to avoid deadlock, probe responses should be processed out-of-order with respect to other commands in command queue 212. The probe response is forwarded to probe response logic 222. Depending on the nature of the probe response, information may be provided to command interpreter through signal lines 221 to indicate to the command interpreter that a data movement command or other command, needs to be sent to the processor. Signal lines 221 may convey a victim data buffer (VDB) buffer location in the processor. In other cases, the probe response information may require no action on the part of the command interpreter. For example, the probe response information indicate a probe miss and that information may be conveyed to allow, e.g., a DMA operation to complete.

There can be several types of probe responses. Probe responses may occur without data movement indicating a cache line hit or miss that does not require data movement. Those probe responses can be embedded in other commands (see FIG. 3A) using the M1, M2 and CH bits. Probe responses may also occur with data movement, e.g., when the cache line is "dirty", meaning it has been modified and differs from the copy of the cache line in system memory. If a cache line is dirty, it needs to be written back into system memory. Probe responses may also be received indicating that there is a command in-flight affecting the cache line that is the subject of the probe response. That means that the probe response has hit in, e.g., the victim data buffer.

A probe response not requiring data movement may be included in the command packet illustrated in FIG. 3A. Several bits (M1, M2, CH) are used to encode the probe status of the oldest outstanding probe issued by the system to the processor. In one embodiment, those bits are encoded as shown in Table 1:

TABLE 1

| M1 | M2 | CH | Description |
|---|---|---|---|
| 0 | 0 | 0 | No probe response |
| 0 | 0 | 1 | Invalid |
| 0 | 1 | 0 | Cache miss on oldest outstanding probe (bit-time 2) |
| 0 | 1 | 1 | Cache hit on oldest outstanding probe (bit-time 2) |
| 1 | 0 | 0 | Cache miss on oldest outstanding probe (bit-time 0) |
| 1 | 0 | 1 | Invalid |
| 1 | 1 | 0 | Invalid |
| 1 | 1 | 1 | Invalid |

Those bits are checked by the command filter and the information forwarded so that the probe response can be disposed of by the system out-of-order with respect to commands in the command queue. The command itself containing the encoded probe status is entered into the command queue for normal in-order processing. When the command is processed, those bits relevant to the probe response can be ignored. A probe response requiring data movement or a probe response that hits in the victim data buffer (VDB) in the processor is provided in a separate command packet (see FIG. 3B) dedicated to probe responses.

The probe response logic 222 may be sufficient to hold multiple probe responses or in a simple implementation, only a single probe response. The probe response logic processes the probe responses both from the probe response commands and extracted other commands, out-of-order with respect to command queue 212 to avoid possible deadlock situations. Further information on handling of probe response information can be found in application Ser. No. 09/586,573, entitled "Out of Order Probing in An In-Order System", previously incorporated by reference.

Figure 4:
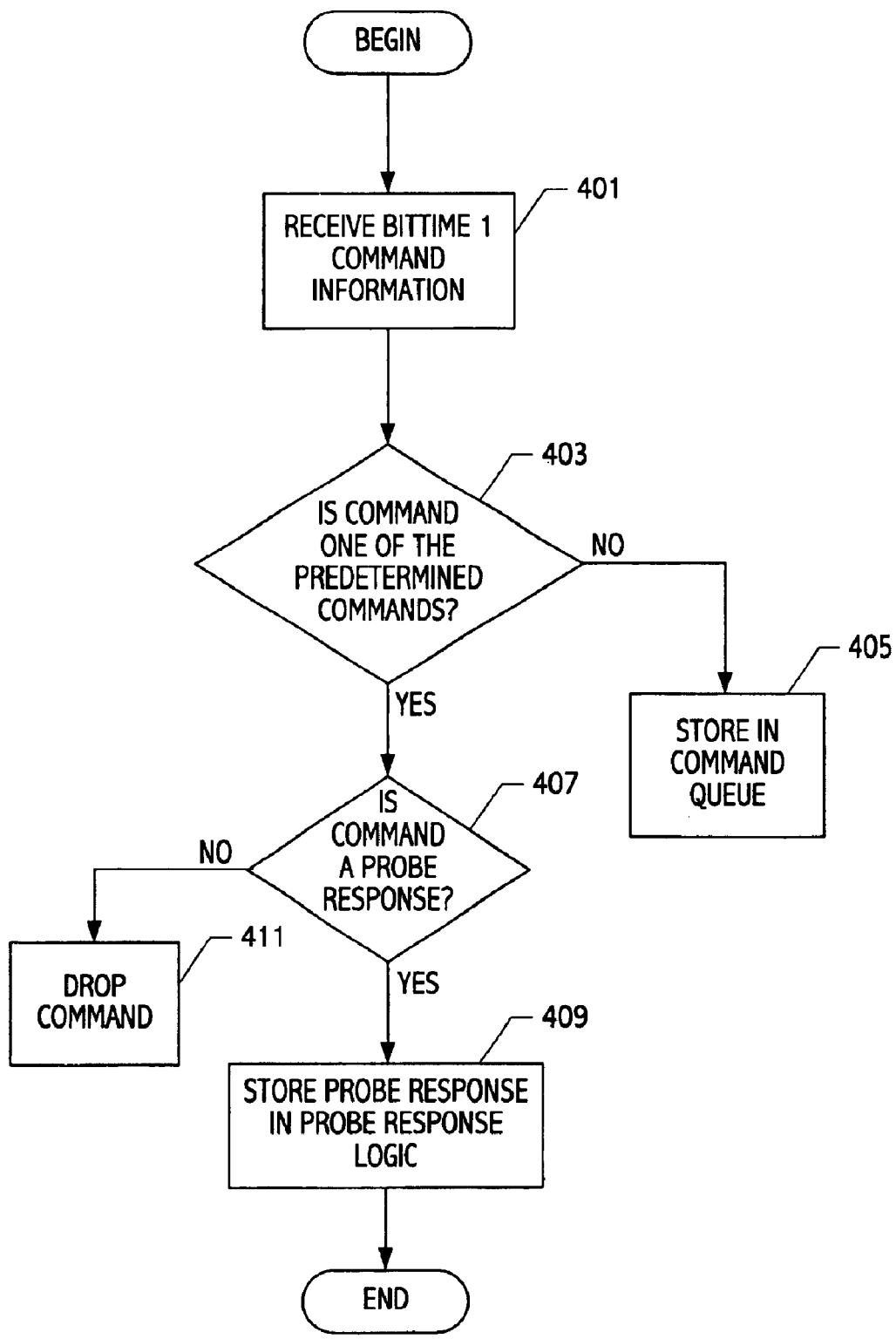
FIG. 4 is a flow chart illustrating operation of filtering commands received in the receive circuit.

Referring to FIG. 4, the flow diagram illustrates the operational flow of the receive circuit and related logic. In 401, a first portion of the 52 bit command information, received in bit time 1, is received into buffer 203. Filter circuit 220 receives the contents of buffer 203, which is selected by muxselect counter 207. In 403, filter circuit 220 determines if the command field in the first portion of the command channel information matches one of the predetermined commands. If not, then the command information is stored in command queue 212 in 405. If the command is one of the predetermined commands, then the receive filter determines in 407 whether or not the command is a probe response. If so, the probe response is supplied to probe response logic 222 in 409. Otherwise, the commands are dropped in 411. That means that all command segments associated with the command segment checked in filter 220 are dropped and not stored in command queue 212. The receive filter then continues receiving additional command information. Although not illustrated in FIG. 4, encoded probe response information present in non-probe response commands is extracted by the command filter and is also forwarded to probe response logic 222 for out-of-order processing.

While the above description assumed the first portion of the 52 bit command information included the relevant command information to compare, one of skill in the art will appreciate that the relevant command information may be received in any phase. In fact, while filter 220 has been described as performing a filter operation based on a particular command, in fact the filter may check for any bit pattern, e.g., an address pattern, and filter out received command channel information appropriately.

As described, one aspect of the commands sent by the processor into the receive circuit is that the commands can be canceled. An example of such a command is a speculative read operation, which may be canceled if the read operation is never actually executed by the code operating on the processor.

Figure 5:
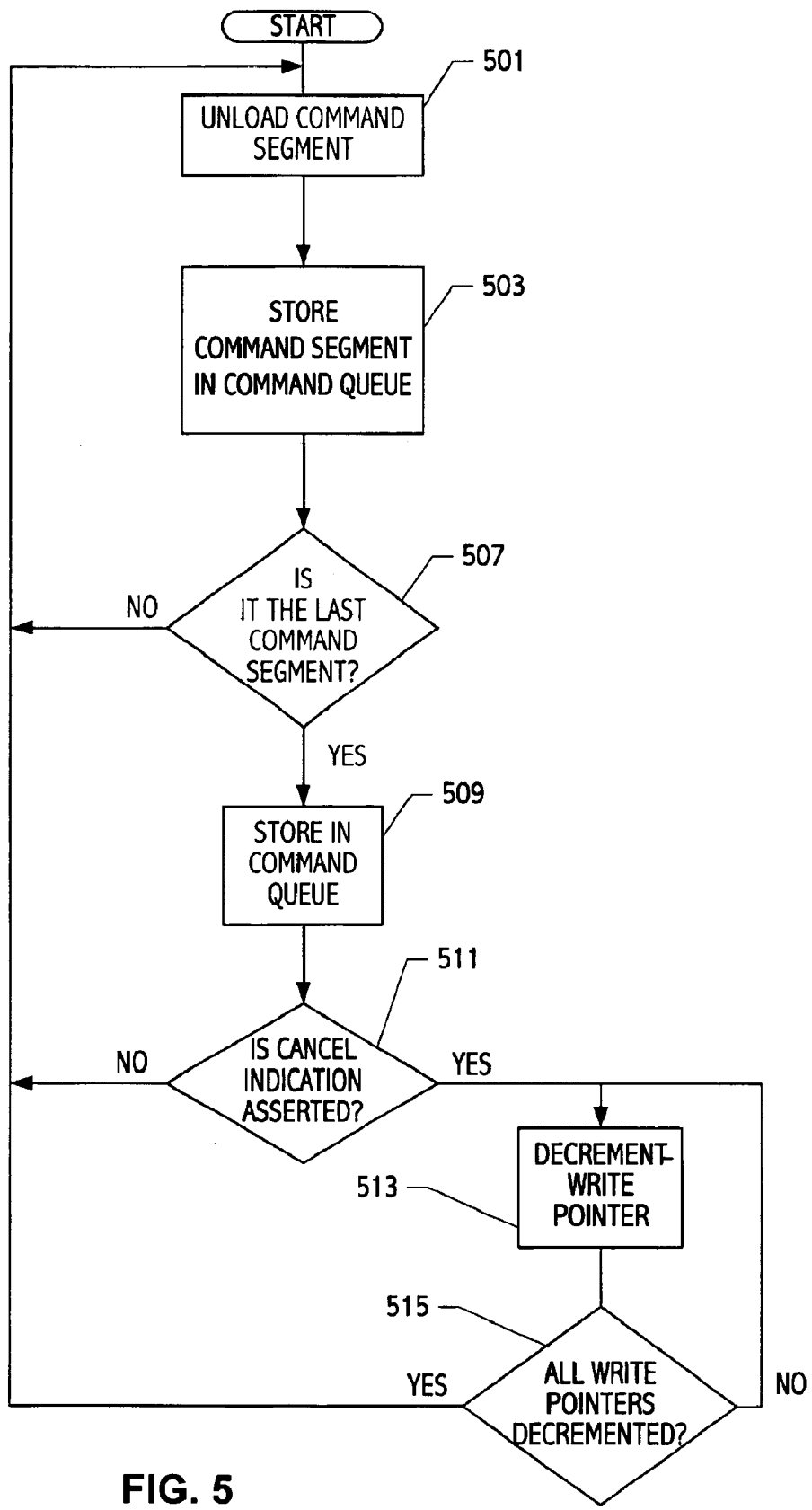
FIG. 5 is a flow chart illustrating responding to a cancellation indication to perform an undo-push operation.

Referring to FIG. 5, operations of the logic circuit in FIG. 2 are illustrated in response to cancellation of a command. The command segments are unloaded from buffers 203–206 in 601 and stored into command queue 212 in 603. However, there is a possibility that the command will be canceled. As each of the command segments are stored in FIFOs 213–219, write pointers associated with the FIFOs, which indicate where to write (also referred to herein as a push operation) the next command segment are incremented. Read pointers are also utilized to indicate the location from which to read (or pop) the next command. The push operations originate on the receiver side and the pop operations unload-data from command queue 212 to the command interpreter Assume it takes four bit times to load the buffers 203–206 with a complete command. After the first bit time (or phase 1 of the command channel cycle), buffer 203, storing the first command segment, is unloaded into FIFO 213. After the second bit time, the second command segment, stored in buffer 204 is unloaded into FIFO 215. After the third bit time, the third command segment, stored in buffer 205 is unloaded into FIFO 217. Assuming the cancellation indication is contained in the command segment received in the last bit time (or phase 4), the circuit in FIG. 2 determines if the current command segment is the last command segment in 507. If so, it is determined if a cancellation indication is asserted in 511. In one embodiment, one of the bits associated with the command segment received in the fourth bit time for a read operation is a read valid bit. The read valid bit indicates whether the current read operation being loaded into command queue 212 is valid. Note that at the time the bit is checked for validity, data from the other three phases have already been loaded into command queue 212. If the bit indicates that the read operation is valid, then the circuit returns to unload a next command in 501.

If however the read valid bit, or other cancellation indication, indicates that the current command should be canceled in operation 511, then to prevent the command interpreter from having to throw out canceled commands, the canceled command needs to be removed from command queue 212. In one implementation, that is accomplished by decrementing write pointers associated with each of the FIFOs storing segments of the canceled command in 513. A state machine can be used to decrement each of the FIFO write pointers so the next push operation will place data into the same FIFO locations, which were used for the canceled read operations. Thus, in 515, it is determined if all write pointers have been decremented and if not, the control logic returns to 513 to decrement the next write pointer. The write pointers may be decremented in consecutive clock cycles. Once all write pointers have been decremented, the control logic has completed the undo-push operation associated with that cancelled command and the next command segment is unloaded from the buffers in 501.

While the logic has detected that the last command segment includes a bit indicating the command is invalid, in order to keep the control logic for all of the FIFOs in command queue 212 the same, the fourth command segment is stored into FIFO 219. That is illustrated at 509. While the operation of storing the last command segment in the command queue is shown as being performed before checking for the cancellation indication, in fact, the push operation may be performed after the check is performed in 511. It is shown prior to the check operation in 511 to illustrate that in this particular implementation, the last segment is always stored in command queue 212. The state machine finishes by decrementing the write pointer for FIFO 219. After that is complete the write pointers for all the FIFOS point to the storage locations for the canceled command. In other implementations, only FIFOs already storing command segments of a canceled command need to have their write pointers decremented and the last FIFO may never be written with the last command segment from a cancelled command. In either case, the push operation for the cancelled command has been undone.

In addition to maintaining a read and write pointer, a content count may be maintained, which is a counter that keeps track of the number of commands in the command queue. If the content counter indicates that the command queue is full and another command arrives from the processor, then an error flag can be asserted, in some implementations, to indicate the error condition. When a command is pushed into the queue, the content counter is incremented and when a command is popped from the queue the content counter is decremented. If the content counter indicates that the command queue is full and another command arrives to be pushed into the command queue, then an error flag can be asserted to indicate the error condition. The content counter may be incremented as a result of an invalid command. If so, content counter is decremented as a result of a cancelled command.

In order to ensure the undo-push operation does not overlap with a push signal coming from the receive circuit, in one embodiment, the undo-push operation starts within one clock of receipt of the read valid bit indicating the command is canceled. That is, the undo-push operation starts by the next bit time 0.

Figure 6:
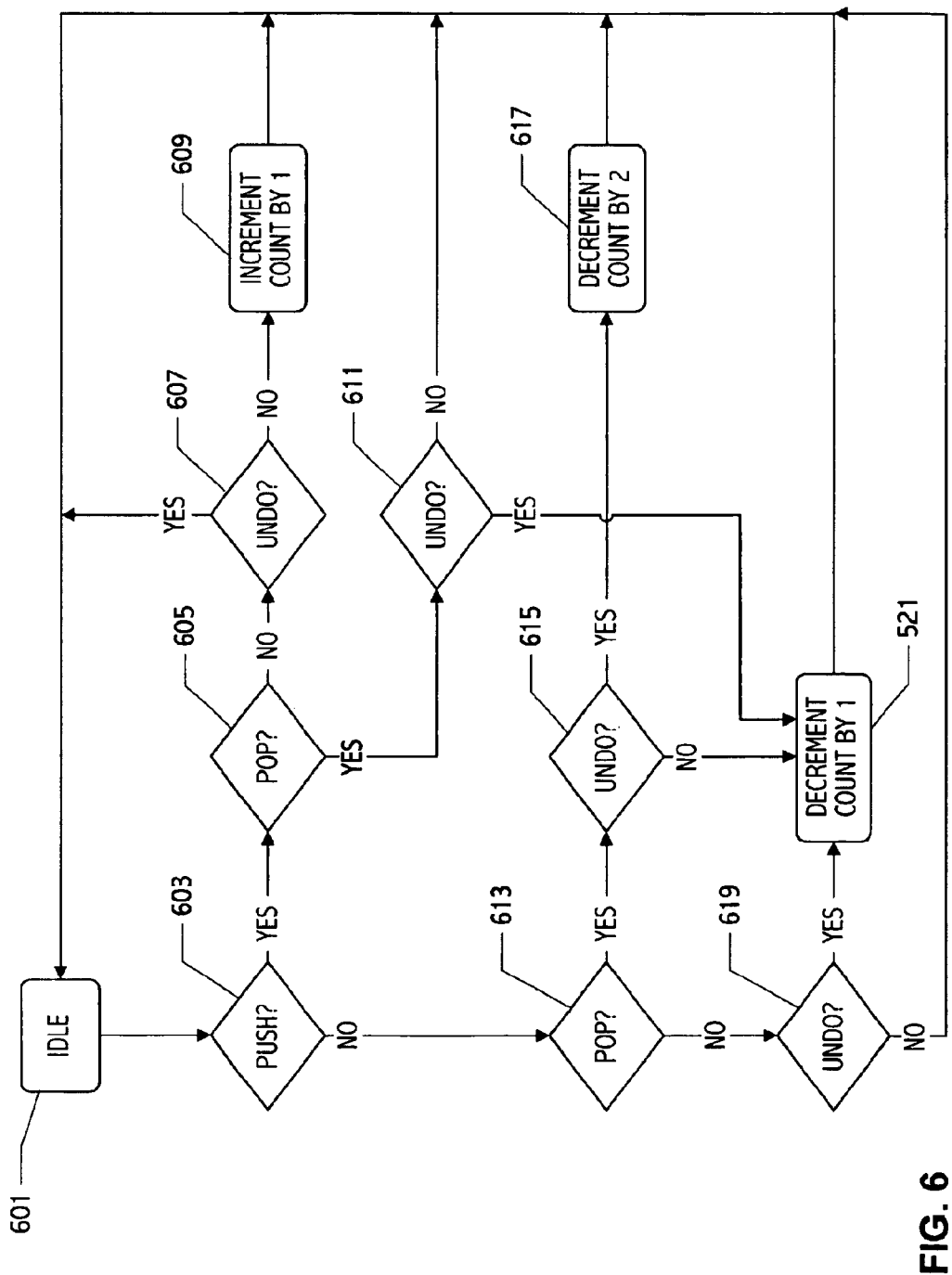
FIG. 6 is a flow chart illustrating operation of adjusting the content count of the command queue in response to various push, pop and undo-push combinations.

However, in an embodiment in which the undo-push operation does overlap with a push signal pushing a next command into the command queue, then the content counter may be adjusted as shown in FIG. 6, which illustrates control for the content counter. If a push operation 603 occurs by itself, the content counter is incremented by 1 in 609 and the write counter also is incremented. That is a normal push operation. If a push operation 603 and an undo-push operation 607 overlap; the content counter and write counter remain the same, and the circuit returns to idle state 601. If a push operation 603 and a pop operation 605 and an undo push operation 611 overlap, then the content counter is decremented by 1 in 621 and the write counter remains the same. If an undo-push operation 619 occurs alone or a pop operation 513 occurs alone, the content counter is decremented by 1 in 621. In the event of the undo-push operation occurring alone, then the write counter decrements. If a pop operation 613 and an undo-push operation 615 overlap, then the content counter is decremented by 2 in 617 and the write counter is decremented by 1.

The description of the invention set forth herein is illustrative, and is not intended to limit the scope of the invention as set forth in the following claims. For instance, while the invention has been described in an embodiment in which the receive circuit is located on a north bridge, one of skill in the art will appreciate that the teachings herein can be utilized any place it is desirable to provide undo-push capability, for example, on a processor with an integrated memory control function. Variations and modifications of the embodiments disclosed herein, may be made based on the description set forth herein, without departing from the scope and spirit forth in the following claims.

What is claimed is:

1. An integrated circuit receiving command information over a plurality of bit times, comprising:
    a command queue storing command information received into the integrated circuit during consecutive bit times; and
    control logic responsive to a cancellation indication in the command information, indicating that a command is canceled, to repoint a write pointer to point to the canceled command already stored in the command queue; and
    wherein the command queue includes a plurality of FIFO buffers, each of the FIFO buffers storing a segment of a received command and wherein a plurality of write pointers point to locations in respective FIFO buffers to store a next command segment, and wherein segments of a command in different FIFO buffers are received at different bit times.

2. The integrated circuit as recited in claim 1 wherein the command is a speculative read operation.

3. The integrated circuit as recited in claim 1 wherein a last FIFO storing a last command segment received during a last bit time for the command information is written to store a last portion of the command.

4. The integrated circuit as recited in claim 3, wherein the indication to cancel the current command is in the last command segment.

5. The integrated circuit as recited in claim 3, wherein each of the plurality of FIFOs has its respective write pointer decremented in consecutive clock intervals.

6. The integrated circuit as recited in claim 1 further comprising a content counter indicating a number of commands stored in the command buffer.

7. The integrated circuit as recited in claim 6 wherein the content counter is decremented as a result of the cancellation indication.

8. A method for storing command information into a command queue in an integrated circuit, comprising:
    receiving a plurality of command segments corresponding to one command in a plurality of phases, each command segment being received in a different phase;
    pushing received command segments into a command queue;
    checking for a cancellation indication for the command being received;
    in response to the cancellation indication, performing an undo-push operation to remove the command segments stored in the command queue associated with the cancelled command; and
    wherein the command queue includes a plurality of FIFO buffers, each of the FIFO buffers storing respective command segments of a command received in a different bit time and wherein a plurality of write pointers point to locations in respective FIFO buffers to store a next command segment.

9. The method as recited in claim 8 wherein the undo push operation includes decrementing the plurality of write pointers.

10. The method as recited in claim 8 wherein further comprising writing a last command segment into a last FIFO buffer, the last command segment including the cancellation indication.

11. The method as recited in claim 8 wherein the cancelled command is a speculative read command.

12. The method as recited in claim 11 wherein the cancellation indication is a read valid bit indicating that the speculative read command is not valid.

13. The method as recited in claim 8 wherein the plurality of write pointers are decremented consecutively.

14. The method as recited in claim 13 wherein the undo push operation is started within one clock of receipt of the cancellation indication.

15. The method as recited in claim 8 further comprising maintaining a count of a number of commands currently in the command buffer.

16. The method as recited in claim 15 further comprising decrementing the count in response to the cancellation indication.

17. A computer system comprising:

a processor;

an integrated circuit coupled to receive a command from the processor over a command channel, the command being received in command segments at corresponding different times;

a command queue in the integrated circuit coupled to receive the command segments, wherein the command queue includes a plurality of FIFO buffers, each of the FIFO buffers storing respective command segments of a command received in a different bit time and wherein a plurality of write pointers point to locations in respective FIFO buffers to store a next command segment; and control logic coupled the command queue and responsive to a cancellation indication in one of the command segments indicative that a current command is canceled to perform an undo-push operation such that a next received command is placed in the command queue in a same location as the current command.

18. The computer system as recited in claim 17 where the integrated circuit includes a count of a number of commands in the command queue and wherein the count is decremented in response to the cancellation indication.

\* \* \* \* \*